No. 722,113. PATENTED MAR. 3, 1903.
J. KOELNER.
APPARATUS FOR KNEADING DOUGH.
APPLICATION FILED MAY 28, 1902.
NO MODEL.

Witnesses.
Robert Everett
Dennis Sumby

Inventor.
John Koelner.
By James L. Norris
Atty.

UNITED STATES PATENT OFFICE.

JOHN KOELNER, OF LOUISVILLE, KENTUCKY.

APPARATUS FOR KNEADING DOUGH.

SPECIFICATION forming part of Letters Patent No. 722,113, dated March 3, 1903.

Application filed May 28, 1902. Serial No. 109,347. (No model.)

*To all whom it may concern:*

Be it known that I, JOHN KOELNER, a citizen of the United States, residing at Louisville, in the county of Jefferson and State of Kentucky, have invented new and useful Improvements in Apparatus for Kneading Dough, of which the following is a specification.

My invention is designed for the production of an improved apparatus for kneading dough, the object of the same being to provide a simple and effective mechanical device by means of which the action of the human hands in the operation of kneading dough may be simulated.

The invention consists of a receptacle into which the dough is placed and a plurality of rotary spirally-arranged kneading-blades therein, the said blades having their axes coincident, having the convolutions thereof extending in the same direction, and having broad flat engaging faces designed to keep the dough in continuous motion and to force the same with a gentle squeezing action toward one end of said receptacle.

Figure 1:
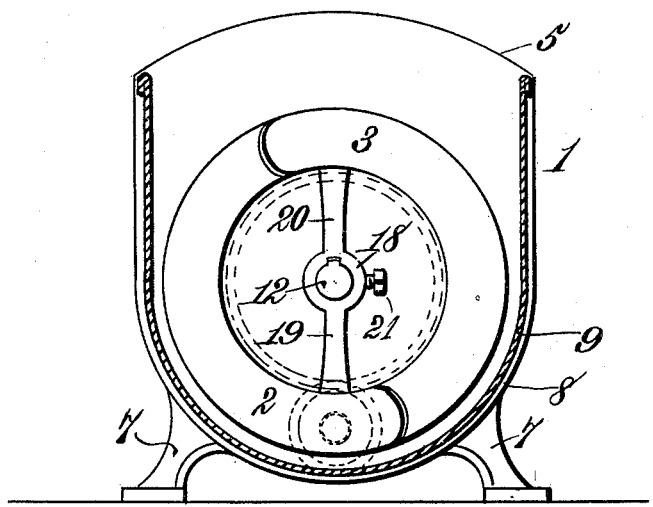
Figure 2:
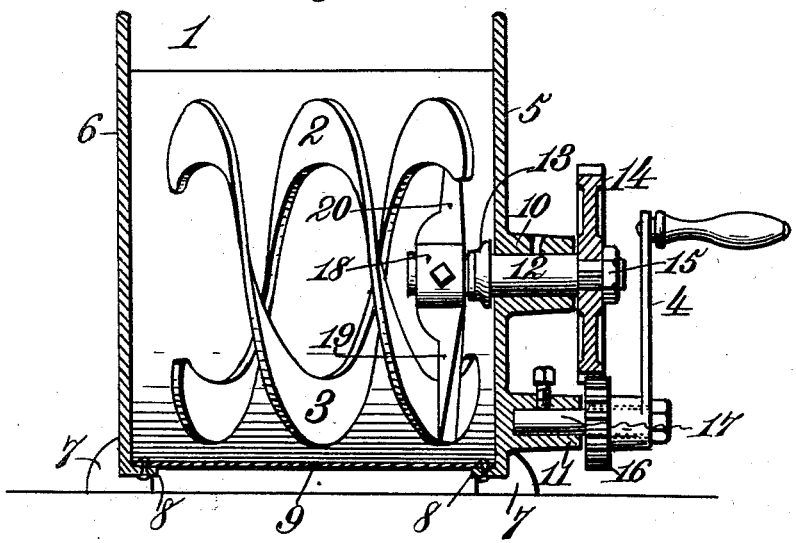

In the drawings forming part of this specification, Figure 1 is a vertical transverse section of a dough-kneader embodying my invention, and Fig. 2 is a vertical longitudinal section of the same.

Like reference-numerals indicate like parts in the different views.

My improved kneader is made up of the receptacle 1, the spirally-arranged kneading-blades 2 and 3 therein, and the crank or handle 4 for rotating the said blades. The receptacle 1 is preferably trough-shaped, although it may be made in cylindrical or other form. Each of the ends 5 and 6 of said receptacle has been shown as being made from a casting having the feet or supports 7 integral therewith. Said ends or heads have also been shown as being provided with inwardly-extending flanges 8 around the side and bottom edges thereof, to which is bolted, riveted, or otherwise secured the U-shaped body portion 9 of the receptacle 1. The end 5 of said receptacle is also provided with a bearing-boss 10 at its center and with a second bearing-boss 11, preferably located below the boss 10. Through the boss 10 extends a shaft 12, having a collar or shoulder 13 thereon, which bears against the inner face of the end 5, and having a gear-wheel 14 on its outer end adjacent to the boss 10. The said shaft 12 is locked in place in its bearings in the boss 10 by means of a nut 15 on the outer end thereof. Meshing with the gear-wheel 14 is a pinion 16, keyed or otherwise secured to a shaft 17, mounted in bearings in the boss 11 and having the operating-crank 4 thereon. By this construction it will be observed that by turning the crank 4 the motion of the shaft 17 will be transmitted through the pinion 16 and gear-wheel 14 to the shaft 12.

The inner projecting end of the shaft 12 has the kneading-blades 2 and 3 connected to it. The specific means of connection between these parts consists of a sleeve 18, splined upon the shaft 12, and a plurality of radially-disposed arms 19 and 20, which are secured to or formed integral with said sleeve and are attached at their outer ends to the kneading-blades 2 and 3, respectively. This connection provides for the rotation of both of the blades 2 and 3 with the shaft 12, but permits the ready removal of said blades from said shaft and from the receptacle 1 when it is desired to remove the dough or clean the blades or receptacle. To prevent the accidental detachment of the blades from the end of the shaft 12, I provide a set-screw 21, which extends through the sleeve 18 and is adapted to engage the outer surface of the shaft 12. Each of the kneading-blades 2 and 3 is spiral in form, extends longitudinally of the receptacle 1, and has broad flat faces throughout its length. The end of each blade opposite the shaft 12 terminates in a plane a short distance from the end or head 6 of the receptacle 1 and is separated from said end. The two blades have their axes coincident, and the convolutions thereof extend in the same direction. As the crank 4 is rotated a similar movement is imparted to the shaft 12 and to the blades 2 and 3, connected therewith. When the receptacle 1 is filled with dough, the action of the kneading-blades upon said dough is to force the same against the end 6 of the receptacle with a gentle compressing squeezing action similar to that imparted by the fingers of the human hand in kneading as contradistinguished from a compacting action, which would defeat the very object of the invention. As the dough is forced against the end 6 of the receptacle 1 it returns through the cylindrical passage within the coils or convolutions of the kneading-blades until it is again acted upon by said blades to force the same in the opposite direction toward said head 6. The result is that the dough is kept in continuous motion, being forced first forwardly with a compressing squeezing action toward the end 6 of the receptacle and thence returning rearwardly through the space within the coils of the blades 2 and 3. Not only is a continuous movement imparted to the dough, but a continuous kneading action is effected thereon.

The receptacle 1 has been shown as being trough-shaped in form—that is to say, it is formed with an open upper end, with parallel side and end walls, and with a curved bottom. The said bottom is curved upon the arc of a circle of which the common axis of the blades 2 and 3 is the center, and the outer edges of each of said blades are located and move in close relation to the inner surface of said bottom. The result is that when said blades are rotated they will act upon all portions of the dough within the receptacle 1, forcing the same first forwardly toward the end or head 6 of said receptacle and then rearwardly through the central cylindrical passage within the convolutions of said blades. By this construction and relative arrangement of parts the formation of pockets in the bottom of the receptacle 1 in which a portion of the dough might lodge is effectually avoided. The kneading-blades 2 and 3 therefore are capable of acting upon all portions of the dough within said receptacle.

Having now described my invention, what I claim as new, and desire to secure by Letters Patent, is—

In an apparatus for kneading dough, a receptacle and a plurality of rotary spirally-arranged kneading-blades therein, the said blades having their axes coincident, having the convolutions thereof extending in the same direction and having broad, flat engaging faces designed to keep the dough in continuous motion and to force the same with a gentle squeezing action toward one end of said receptacle.

In testimony whereof I have hereunto set my hand in presence of two subscribing witnesses.

JOHN KOELNER.

Witnesses:
OSCAR M. COLLUM,
J. C. DODD.